United States Patent [19]

Wunderlich

[11] Patent Number: 5,489,330

[45] Date of Patent: Feb. 6, 1996

[54] COPPER PHTHALOCYANINE LIQUID FINISHED PREPARATION

[75] Inventor: Klaus Wunderlich, Leverkusen, Germany

[73] Assignee: Bayer Aktiengesellschaft, Leverkusen, Germany

[21] Appl. No.: 146,280

[22] Filed: Oct. 29, 1993

[30] Foreign Application Priority Data

Nov. 6, 1992 [DE] Germany ............ 42 37 545.2

[51] Int. Cl.$^6$ ..................... C09D 11/02
[52] U.S. Cl. .............. 106/20 D; 106/410; 106/411; 106/413
[58] Field of Search ............. 106/20 D, 410, 106/411, 413

[56] References Cited

U.S. PATENT DOCUMENTS

| | | | |
|---|---|---|---|
| 4,111,650 | 9/1978 | Lacroix et al. | 8/85 R |
| 4,732,615 | 3/1988 | Kawashita et al. | 106/22 |
| 4,845,209 | 7/1989 | Adams | 540/132 |

FOREIGN PATENT DOCUMENTS

| | | |
|---|---|---|
| 0184991 | 6/1986 | European Pat. Off. . |
| 0196901 | 10/1986 | European Pat. Off. . |
| 2155779 | 5/1973 | Germany . |
| 2629675 | 1/1977 | Germany . |
| 2842187 | 4/1980 | Germany . |

OTHER PUBLICATIONS

Patent Abstracts of Japan, vol. 14, No. 80 (C–689) [4023], Feb. 15, 1990, 1 page, Nippon Kayaku Co., No. 1–297,468. "Aqueous Liquid Composition and Dyeing of Paper and Pulp with the Same Composition", M. Hiraki.
Derwent Abstract: Textiles, Paper–Cellulose; p. 5, Week 9003, NIPK, F09, 90–018287/03, JO 1297–468–A; "Aq. liq. compsn. for dyeing paper turquoise . . . " Nippon Kayaku KK, May 26, 1988, JP-127000.
JP–A–01 297–468—Derwent Abstract Feb. 15, 1990 CA 93:48453x—Chemical Abstracts Apr. 1980.
Chemical Abstract: 39–Textiles, vol. 93, 48453x 1980, p. 91.

*Primary Examiner*—Mark L. Bell
*Assistant Examiner*—Scott L. Hertzog
*Attorney, Agent, or Firm*—Sprung Horn Kramer & Woods

[57] ABSTRACT

The new aqueous finished preparations of copper phthalocyanine dyestuffs comprising a dyestuff of the formula $$CuPc\begin{cases} (SO_2NH-A-N-R^2)_x \\ \phantom{xx} \overset{|}{R^1} \\ (SO_3H)_y \end{cases}$$

where CuPc, A, $R^1$, $R^2$, x and y have the meaning given in the description, are storage-stable and are outstandingly suitable for dyeing and printing cellulose-containing materials.

12 Claims, No Drawings

COPPER PHTHALOCYANINE LIQUID FINISHED PREPARATION

The present invention relates to stable aqueous finished preparations of copper phthalocyanine dyestuffs and their use for dyeing and printing cellulose-containing materials.

Liquid dyestuff formulations, for example of copper phthalocyanine dyestuffs, in general are the preferred commercial forms of the dyestuffs used for dyeing cellulose-containing materials, in particular paper. These liquid dyestuff formulations are in general aqueous solutions having a dyestuff content of about 5–25% by weight, which are prepared by addition of organic solvents. The organic solvent serves to stabilize the solution and also to achieve the dyestuff concentration appropriate in practice.

High requirements are imposed on the stability of the liquid finished preparations. No precipitation or crystallization at all should occur even after prolonged storage.

When these liquid dyestuff formulations are used for dyeing paper, for example, however, these organic solvents enter the waste water and thus represent ecological pollution.

The aim of the present invention was to provide stable, concentrated, aqueous finished preparations of anionic copper phthalocyanine dyestuffs containing basic groups which are free from organic solvents.

The present invention relates to a concentrated aqueous finished dyestuff preparation, characterized in that it comprises one or more copper phthalocyanine compounds which, in the form of the free acid, correspond to the formula $$CuPc \begin{matrix} (SO_2NH-A-N-R^2)_x \\ \\ (SO_3H)_y \end{matrix} \overset{R^1}{|} \quad (I)$$

wherein

CuPc represents a copper phthalocyanine radical,

A represents optionally substituted straight-chain or branched $C_2$–$C_6$-alkylene, $R^1$ and $R^2$ independently of one another represent hydrogen or in each case optionally substituted straight-chain or branched $C_1$–$C_6$-alkyl or $C_1$–$C_6$-hydroxyalkyl, with the proviso that at least one radical $R^1$ or $R^2$ represents optionally substituted $C_1$–$C_6$-hydroxyalkyl, x represents 1 to 3.5, y represents 0.5 to 3, and the sum of x and y is 2.5 to 4, and has a pH of 8 to 13, preferably 11 to 13.

Aqueous finished dyestuff preparations, which have a pH of between 8 and 13 and can be used for dyeing paper, of certain copper phthalocyanine dyestuffs which are free from hydroxyl groups have already been disclosed in JP-A 01 297 468. As can be seen from the examples of JP-A 01 297 468, however, the addition of organic solvents cannot be dispensed with in most cases, or only a 10% strength formulation is achieved, in spite of intermediate isolation being carried out.

Surprisingly, the dyestuffs of the formula (1) employed according to the invention are distinguished by significantly better solubility in the pH range specified for the finished dyestuff preparation according to the invention than those of JP-A 01 297 468.

EP-A-0,184,991 claims the use of cationic phthalocyanine compounds for dyeing and printing substrates which can be dyed with cationic dyestuffs. The cationic phthalocyanine compounds are obtained by quaternization of certain starting compounds.

A process for dyeing and printing cellulose fibres swollen with water-miscible swelling agents or mixed fibres containing these with certain copper phthalocyanine compounds is known from DE-A-2 842 187.

The present invention furthermore relates to a process for dyeing and printing cellulose-containing materials, in particular paper and cellulose, characterized in that one or more copper phthalocyanine compounds which, in the form of the free acid, correspond to the formula $$CuPc \begin{matrix} (SO_2NH-A-N-R^2)_x \\ \\ (SO_3H)_y \end{matrix} \overset{R^1}{|} \quad (I)$$

wherein

CuPc, A, $R^1$, $R^2$, x and y have the abovementioned meaning, are employed as the dyestuffs.

The process according to the invention is preferably used for pulp dyeing and surface dyeing of paper and cellulose.

The process according to the invention can be carried out, for example, by dissolving the dyestuff in water with addition of organic or inorganic acids (for example acetic acid) or alkali metal hydroxides (for example sodium hydroxide). The resulting solution can then be used as the liquid finished preparation according to the invention in the processes for dyeing paper described below.

Possible substituents for straight-chain or branched $C_2$–$C_6$-alkylene in the definition of A are, for example, OH or $C_1$–$C_6$-alkoxy.

Examples which may be mentioned of substituents for straight-chain or branched $C_1$–$C_6$-alkyl and $C_1$–$C_6$-hydroxyalkyl in the definition of $R^1$ and $R^2$ are: OH, $C_1$–$C_6$-alkoxy, amino, $C_1$–$C_6$-alkylamino, $C_1$–$C_6$-dialkylamino and sulphato.

Preferred finished dyestuff preparations according to the invention are those which comprise one or more copper phthalocyanine compounds of the formula (I) wherein A represents ethylene or propylene, $R^1$ represents hydrogen or straight-chain or branched $C_1$–$C_3$-alkyl which is optionally substituted by hydroxyl and $R^2$ represents —$CH_2CH_2OH$.

Particularly preferred finished dyestuff preparations according to the invention are those which contain one or more compounds of the formula (II)

$$CuPc \begin{matrix} (SO_2NH-CH_2CH_2CH_2-N \begin{matrix} CH_3 \\ \\ CH_2CH_2OH \end{matrix})_x \\ \\ (SO_3H)_y \end{matrix} \quad (II)$$

where

CuPc, x and y have the meaning given for formula (I).

The finished dyestuff preparations according to the invention are preferably aqueous solutions having a content of dyestuff of the formula (I) of 5 to 25% by weight, preferably 10 to 25% by weight.

The finished dyestuff preparations according to the invention are distinguished by a good storage stability of, for example, 6 weeks at −2° C. or +40° C.

The finished dyestuff preparations according to the invention can be prepared by dissolving the dyestuff of the formula (I) in water with addition of inorganic and/or organic bases. It is also possible for the synthesis solution or suspension obtained during preparation of the dyestuff of the formula (I) to be converted into the finished dyestuff preparations according to the invention by addition of inorganic and/or organic bases and, if appropriate, water, without intermediate isolation of the dyestuff. Organic additives which improve solubility can usually be dispensed with entirely here.

The synthesis solution or suspension can be purified and desalinated beforehand by using membrane processes, such as, for example, ultrafiltration, microfiltration and reverse osmosis, or combinations thereof, and can then be converted into the finished dyestuff preparation according to the invention by addition of a base.

The finished dyestuff preparations according to the invention can comprise the customary additives, such as, for example, surfactants and fungicides.

Examples which may be mentioned of inorganic and organic bases are:

hydroxides, carbonates and bicarbonates of lithium, sodium, potassium and ammonium;

organic amines, such as monoethanol-, diethanol-, triethanol-, 3-propanol-, 2-propanol-, dipropanol-, tripropanol-, triisopropanol-, diethyl-, triethyl-, methyldiethanol-, ethyldiethanol-, N-methylethanol-, N-ethylethanol-, N,N-dimethylethanol-, N,N-diethylethanol- and N-phenylethanolamine. Alkali metal hydroxides, in particular sodium hydroxide, are preferably used for establishing the pH of the finished dyestuff preparations according to the invention.

The copper phthalocyanine compounds contained in the finished dyestuff preparations according to the invention correspond, in the form of the free acid, to the formula (I). The compounds (I) are preferably salts of these free acids with organic or inorganic bases. Possible bases here are preferably the abovementioned organic and inorganic bases.

Possible organic additives which improve solubility are, for example: the abovementioned organic amines, and furthermore acid amide compounds, such as urea, alkylurea or ε-caprolactam, and moreover water-soluble organic solvents, such as for example, ethylene glycol, diethylene glycol, triethylene glycol, polyethylene glycol, propylene glycol, dipropylene glycol, polypropylene glycol, butylene glycol, methylcellosolve, carbitol, methylcarbitol, dimethyl ether, ethylene glycol monobutyl ether, diethylene glycol monobutyl ether, triethylene glycol monobutyl ether, triethylene glycol monomethyl ether, propylene glycol monomethyl ether, butylpolyglycol, phenylglycol, hexylene glycol, thioglycol, glycerol, tetrahydrofuran, dioxane, butyrolactone, N-methyl-2-pyrrolidone, formamide, dimethylformamide, and methyl, ethyl, propyl and butyl alcohol.

However, the finished dyestuff preparations according to the invention are preferably free from organic additives which improve solubility.

The copper phthalocyanine compounds of the formula (I) can be prepared in the customary manner, which is known per se, by condensation of copper phthalocyanine sulphochlorides or sulphochloride-sulphonic acids with an amine of the formula

(III)

wherein

A, $R^1$ and $R^2$ have the abovementioned meaning, and if appropriate subsequent hydrolysis of excess sulphochloride groups.

The dyestuff can be isolated from the resulting crude dyestuff solution or suspension by customary methods, such as, for example, salting out and filtration, or by the membrane separation processes already mentioned above. In most cases, however, intermediate isolation is not necessary.

The present invention furthermore relates to the use of the finished dyestuff preparations according to the invention for dyeing and printing cellulose-containing material, in particular paper and cellulose.

The following possibilities in general exist for dyeing papers and celluloses:

(a) Pulp dyeing, in which the dyestuffs are added to the pulp stock, which has not yet been processed to paper, during or after beating of the cellulose.

(b) Surface dyeing, in which the dyestuffs are added to the sizing liquor during the paper sizing operation.

Furthermore, the methods in which a coating composition of dyestuffs, inorganic white pigments, binders and, if appropriate, other additives is applied to the surface of the paper are also possible.

The finished dyestuff preparation according to the invention is suitable for any dyeing method, but preferably for pulp dyeing.

In pulp dyeing, the cellulose is first beaten to a certain freeness. 0.01–2.0% of the finished dyestuff preparation according to the invention is then added to the pulp stock at 10°–40° C., an amount of active compound of 0.01–2.0%, based on the dry weight of the pulp, in general being employed. If required, customary sizing agents, aluminium sulphates, paper reinforcing agents, fixing agents and the like, are furthermore subsequently added. The pulp is then subjected to the usual paper-making and drying operations. A paper which is dyed a uniformly brilliant turquoise blue and shows no veining is obtained in this manner.

In surface-dyeing in a size press, the cellulose is likewise first beaten to a certain freeness.

Customary fillers, sizing agents, aluminium sulphates, fixing agents and the like are then added to the pulp stock if required. The pulp stock is then processed to paper by the customary method. Thereafter, the paper is treated in the size press with a sizing liquor which comprises the finished dyestuff preparation according to the invention, and is then dried. A paper dyed a brilliant turquoise blue is achieved in this manner.

The content of copper phthalocyanine compound of the formula (I) in the size press liquor here is usually 0.04–2.0% (calculated on the basis of the pure content) and the deposit of coating composition is as a rule 1–3 g/m² (solids content), based on the dry weight of the paper.

The finished dyestuff preparation according to the invention exhibits a high affinity for cellulose fibres and therefore results in a good colour yield (good depth of colour). The dyed papers are distinguished by a good fastness to water and bleeding.

The present invention furthermore relates to a process for printing carrier materials by means of an ink jet recording system, a finished dyestuff preparation according to the invention being employed as the recording liquid. Such a recording liquid according to the invention preferably comprises 0.5–15% of an alkali metal salt or ammonium salt of a dyestuff of the formula (I), 0–30% of one or more water-soluble organic solvents, water, and if appropriate, other additives customary for ink jet recording liquids, and has a pH of from 8 to 12.

Examples of suitable water-soluble solvents are glycols and glycol ethers, such as ethylene glycol, diethylene glycol, triethylene glycol, 1,2-dihydroxy-propane, 1-ethoxy-2-hydroxy-propane, polyethylene glycols having molecular weights of up to 500, and heterocyclic ketones, such as 2-pyrrolidone, 2-(N-methyl)-pyrrolidone and 1,3-dimethylimidazolid-2-one.

The ink jet recording process is known per se. In this process, droplets of a writing liquid are ejected from one or more small jets in a targeted manner onto a carrier material, for example onto paper, wood, textiles, plastic or metal. The individual droplets are combined to form written symbols or graphic patterns by electronic control.

The cyan-coloured prints on writing papers obtained with the recording liquids according to the invention by means of an ink jet recording system are distinguished by a good light- and wet-fastness.

The following examples are intended to illustrate the present invention.

The term "parts" always relates to parts by weight, unless stated otherwise.

EXAMPLE 1

143.6 parts of 96% pure copper phthalocyanine (=137.9 parts of 100% pure compound) are introduced into 748.3 parts of chlorosulphonic acid in the course of 1 hour, while stirring, and the mixture is heated to 138° C. in the course of 1.5 hours. After the mixture has been stirred at 138° C. for 8 hours, it is cooled to 85° C., and 94.4 parts of thionyl chloride are added dropwise at 85° to 88° C. in the course of 2 hours. The mixture is then heated to 90° to 92° C. and stirred at this temperature for 4 hours. After cooling to 20° to 30° C., the reaction mixture is discharged onto a mixture of 1000 parts of water and a 1000 parts of ice, while stirring. The temperature is kept at −2° C. to 0° C. by continuous addition of 1500 parts of ice. The product is filtered off with suction and washed with 1200 parts of ice-water (900 parts of water and 300 parts of ice).

The moist suction filter cake is stirred into 250 parts of water and 250 parts of ice and brought to a pH of 7 at 0° C. by addition of 15% strength sodium hydroxide solution. After addition of 100 parts of ice, 95.2 parts of N-methyl-N-(3-aminopropyl)-ethanolamine are added dropwise in the course of 15 minutes. During this addition, the pH rises to 10.5. The pH is brought to 10.8 to 11.0 by dropwise addition of 15% strength sodium hydroxide solution. The temperature is allowed to rise to 20° to 25° C. in the course of 1 hour and is then kept at 20° to 25° C. for 3 hours. During this time, the pH is kept at 10.8 to 11.0 by dropwise addition of 15% strength sodium hydroxide solution. The mixture is then heated to 60° C. in the course of 1 hour and subsequently stirred at this temperature for 1 hour (pH always 10.8 to 11.0). After cooling to 20° to 25° C., the pH is brought to 12.0 by addition of 15% strength sodium hydroxide solution. 10 parts of a commercially available clarifying auxiliary based on kieselguhr (for example Dicalite®) are added to the solution. After the mixture has been stirred for 0.5 hour, it is filtered and the clarification residue is washed with 50 parts of water. After addition of 100 parts of water to the filtrate, about 2040 parts of a liquid finished formulation according to the invention which comprises the dyestuff which, in the form of its free acid, corresponds to the approximate formula

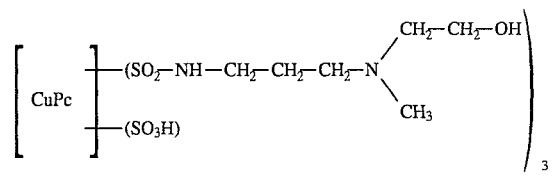

as a stable, approximately 14.5% strength solution are obtained ($\lambda_{max}$: 625, 664-$H_2O$/pH 12.5).

EXAMPLE 2

A mixture of 50% of bleached pine sulphate cellulose and 50% of bleached birch sulphate cellulose is beaten to a freeness of 36° SR at a consistency of 2.5%.

200 g of this suspension, comprising 5 g of cellulose, are introduced into a glass beaker, 20 ml of a 0.5% strength aqueous solution of the liquid finished preparation according to the invention from Example 1 (2%, based on the cellulose) are added and the mixture is stirred for 5 minutes. 10 ml of a 1% strength resin size solution are then added, 15 ml of a 1% strength aluminium sulphate solution are added after a further minute, and the mixture is diluted with 800 ml of water and stirred for a further 3 minutes.

A sheet of paper is formed from this cellulose suspension on a manual sheet former, and the resulting sheet is pressed off in a manual press and dried on a drying cylinder at 100° C. for 10 minutes, turning twice.

The paper dyeing thus obtained shows a brilliant turquoise blue with a good depth of colour and has a very good fastness to bleeding and light. The screen water obtained shows only very slight staining with dyestuff.

EXAMPLE 3

To demonstrate the improved veining properties, Example 2 is repeated, with the only change being that stirring is omitted during addition of the dyestuff solution according to the invention. In this case also, a very uniform paper dyeing without veining is obtained.

EXAMPLE 4

If the 95.2 parts of N-methyl-N-(3-aminopropyl)-ethanolamine employed in Example 1 are replaced by 63.5 parts of the same amine and the procedure is otherwise the same, a stable liquid finished preparation according to the invention of a dyestuff which, in the form of its free acid, corresponds to the approximate formula

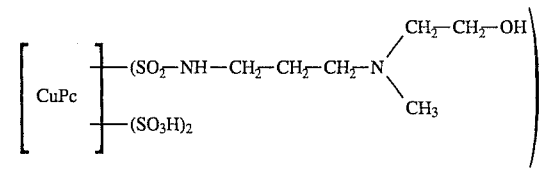

is obtained ($\lambda_{max}$: 622, 661-$H_2O$/pH 12.5). This dyestuff also produces a uniform, brilliant turquoise blue dyeing, for example by the process of Example 2.

EXAMPLE 5

If the 95.2 parts of N-methyl-N-(3-aminopropyl)-ethanolamine employed in Example 1 are replaced by 117.6 parts of N,N-bis(hydroxyethyl)-trimethylenediamine and the procedure is otherwise the same, a stable liquid finished preparation according to the invention of a dyestuff which, in the form of its free acid, corresponds to the approximate formula

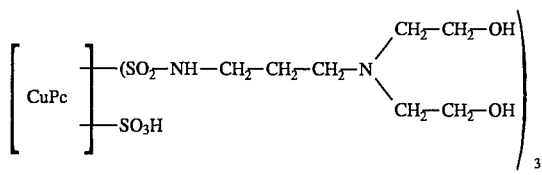

and dyes paper pulp in brilliant turquoise blue shades is obtained.

If the 117.6 parts of N,N-bis(hydroxyethyl)trimethylenediamine employed in the above example are replaced by 117.6 parts of N,N-bis(hydroxyethyl)-ethylenediamine, a stable liquid finished preparation of a dyestuff with comparable dyeing properties is obtained.

EXAMPLE 6

35.9 parts of 96% pure copper phthalocyanine (34.5 g of 100% pure compound) are introduced into 189 parts of chlorosulphonic acid in the course of 1 hour, while stirring, and the mixture is heated to 138° C. in the course of 1.5 hours and then stirred at this temperature for a further 8 hours. After cooling to 20° to 30° C., the reaction mixture is discharged onto a mixture of 500 parts of water and 500 parts of ice, while stirring. The product is filtered off with suction and washed with a mixture of 300 parts of water, 200 parts of ice and 10 parts of concentrated hydrochloric acid.

The moist suction filter cake is stirred into 100 parts of water and 100 parts of ice and brought to a pH of 7.0 at 0° C. by addition of 15% strength sodium hydroxide solution. 19.9 parts of N-methyl-N-(3-aminopropyl)-ethanolamine are then added dropwise and the pH is kept at 10.8 to 11.0 at room temperature for 3 hours by addition of 15% strength sodium hydroxide solution. After the mixture has been stirred at 60° C. and a pH of 10.5 for 1 hour it is cooled to 20° to 30° C. The pH is brought to 12.0 by addition of 15% strength sodium hydroxide solution. 2.5 parts of a commercially available clarifying auxiliary based on kieselguhr (for example Dicalite®) are added and, after the mixture has been stirred for 0.5 hour, it is filtered and the residue is washed with 20 parts of water.

570 parts of a liquid finished preparation according to the invention which comprises the dyestuff which, in the form of its free acid, corresponds to the approximate formula ($\lambda_{max}$: 623, 663 -H$_2$O/pH 2.5) as a stable solution are

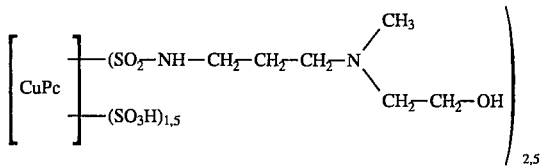

obtained as the filtrate. This dyestuff also produces a uniform, brilliant turquoise blue dyeing, for example by the process of Example 2.

EXAMPLE 7

35.9 parts of 96% pure copper phthalocyanine (34.5 g of 100% pure compound) are introduced into 187.1 parts of chlorosulphonic acid in the course of 1 hour, while stirring, and the mixture is heated to 138° C. in the course of 1.5 hours. After the mixture has been stirred at 138° C. for 8 hours, it is allowed to cool to 85° C., and 23.6 parts of thionyl chloride are added dropwise at 85° to 88° C. in the course of 2 hours.

The mixture is then heated to 90° to 92° C. and stirred at this temperature for 4 hours. After cooling to 20° to 30° C., the reaction mixture is discharged onto a mixture of 250 parts of water and 250 parts of ice, while stirring. The temperature is kept at –2° C. to 0° C. by continuous addition of 400 parts of ice. The product is filtered off with suction and washed with 300 parts of ice-water (200 parts water and 100 parts of ice).

The moist suction filter cake is stirred into 90 parts of water and 90 parts of ice and brought to a pH of 7 at 0° C. by addition of 15% strength sodium hydroxide solution. After addition of 25 parts of ice, 21.3 parts of N-(hydroxyethyl)trimethylenediamine are added dropwise in the course of 15 minutes. During this addition, the pH rises to 10.4. The pH is brought to 10.8 to 11.0 by dropwise addition of 15% strength sodium hydroxide solution. The temperature is allowed to rise to 20° to 25° C. in the course of 1 hour and is then kept at 20° to 25° C. for 3 hours. During this time, the pH is kept at 10.8 to 11.0 by dropwise addition of 15% strength sodium hydroxide solution. The mixture is then heated to 60° C. in the course of 1 hour and is subsequently stirred at this temperature for 1 hour (pH always 10.8 to 11.0). After cooling to 20° to 25° C., the pH is brought to 7.5 with 5% strength hydrochloric acid. After 1 hour, the dyestuff which has precipitated and which, in the form of its free acid, corresponds to the approximate formula

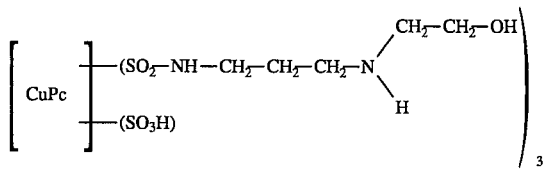

($\lambda_{max}$: 619, 664-H$_2$O/pH 12.5) is filtered off with suction and washed twice with a little water. The moist suction filter cake is brought to a total weight of 600 parts with water and brought to a pH of 12.5 by addition of 15% strength sodium hydroxide solution, while stirring. After topping up to 710 parts with water, a 10% strength liquid finished preparation according to the invention of the above dyestuff is obtained.

If the 21.3 parts of N-(hydroxyethyl)-trimethylenediamine in the above example are replaced by 18.8 parts of N-(hydroxyethyl)-ethylenediamine and the mixture is finally topped up to 690 parts instead of 710 parts, a liquid finished preparation according to the invention which comprises the dyestuff which, in the form of its free acid, corresponds to the approximate formula

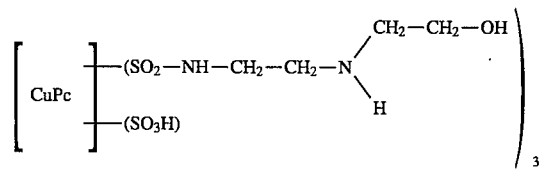

as a stable approximately 10% strength solution is obtained.

EXAMPLE 8

10.4 parts of the liquid finished preparation obtained according to Example 1 (dyestuff content about 14.5%) are diluted with a mixture of 81 parts of water and 9 parts of diethylene glycol and brought to a pH of 9.8 by addition of a little 10% strength hydrochloric acid. The recording liquid thus obtained produces prints in light- and wet-fast cyan shades on customary writing papers by means of a Hewlett- Packard DeskJet® printer.

What is claimed is:

1. A stable concentrated aqueous dyestuff solution which comprises one or more copper phthalocyanine compounds which, in the form of the free acid, correspond to the formula

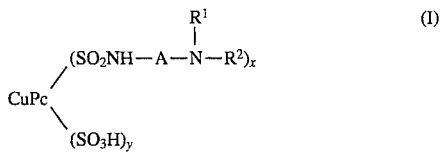

wherein

CuPc represents a copper phthalocyanine radical,

A represents substituted or unsubstituted, straight-chain or branched $C_2$–$C_6$-alkylene, $R^1$ and $R^2$ independently of one another represent hydrogen, substituted or unsubstituted, straight-chain or branched $C_1$–$C_6$-alkyl or substituted or unsubstituted, straight-chain or branched $C_1$–$C_6$-hydroxyalkyl, with the proviso that at least one radical $R^1$ or $R^2$ represents substituted or unsubstituted, straight-chain or branched $C_1$–$C_6$-hydroxyalkyl, x represents 1 to 3.5, y represents 0.5 to 3, and the sum of x and y is 2.5 to 4, and has a pH of 8 to 13.

2. A dyestuff solution according to claim 1 which has a pH of 11 to 13.

3. A solution according to claim 1 wherein

A represents ethylene or propylene, $R^1$ represents hydrogen, unsubstituted straight-chain or branched $C_1$–$C_3$-alkyl or straight-chain or branched $C_1$–$C_3$-alkyl which is substituted by hydroxyl and $R^2$ represents —$CH_2CH_2OH$.

4. A solution according to claim 1 wherein I comprises one or more compounds of the formula (II)

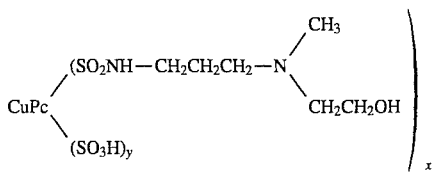

5. A solution according to claim 1 which contains no organic additives which improve solubility.

6. A solution according to claim 1 in which the pH has been adjusted by addition of an alkali metal hydroxide.

7. A process for dyeing cellulose-containing material which composes applying thereto a solution according to claim 1.

8. The process of claim 7, in which the cellulose-containing material is paper or cellulose.

9. The process of claim 7, in which the cellulose-containing material is paper or cellulose which is dyed in the pulp.

10. The process of claim 7, in which the cellulose-containing material is paper or cellulose which is dyed on the surface.

11. In the printing of a carrier material by applying thereto an ink jet recording liquid, the improvement which comprises employing as the liquid an aqueous dyestuff solution according to claim 1.

12. Ink jet recording liquid which comprises a) 0.5–15% of an alkali metal salt or ammonium salt of a dyestuff of the formula (I) of claim 1, b) 0–30% of one or more water-soluble organic solvents and c) water and has a pH of 8.5–12.0.

* * * * *